UNITED STATES PATENT OFFICE 2,610,180

ETHYL OXYETHYL CELLULOSE DERIVATIVES AND METHOD OF PREPARATION OF THE SAME

Eugene D. Klug, Wilmington, Del., assignor to Hercules Powder Company, Wilmington, Del., a corporation of Delaware No Drawing. Application March 31, 1951, Serial No. 218,697

7 Claims. (Cl. 260—231)

This invention relates to cellulose ethers and more particularly to modified cellulose ethers of high solubility in organic solvents.

It is known that ethyl cellulose can be prepared in a wide range of solubility characteristics and that solubility in organic solvents including its tolerance for low-priced aliphatic hydrocarbons in general increases with increase in the degree of substitution (D. S.) of the cellulose but that ethyl cellulose having a high ethoxyl D. S. in the range of about 3 is brittle and has poor film-forming properties. Moreover, the production of ethyl cellulose of sufficiently high degree of substitution to provide high tolerance for aliphatic hydrocarbon solvents heretofore has required repeated alkylation with diminishing conversion per treatment as the degree of substitution increases. Any commercially suitable process for the production of ethyl cellulose of high solubility in organic solvents must be simple economical of reagents, and give a controlled degree of degradation of the cellulose molecule. The present invention is directed toward such a process.

In accordance with the present invention, it has been found that ethyl cellulose of high tolerance for aliphatic hydrocarbons and high degree of substitution is produced in relatively high percentage conversion by first hydroxyethylating cellulose uniformly to a low degree of substitution within the range of 0.3 to 0.9 and then ethylating the hydroxyethyl cellulose so produced to the desired ethoxyl content up to the range of optimum solubility and other characteristics which correspond to an ethoxyl D. S. within the range of 2.6 to 2.9. In accordance with the present invention, such a modified ethyl cellulose of a high degree of substitution showing good film-forming characteristics, excellent solubility in the aromatic hydrocarbon solvents, and high tolerance for aliphatic hydrocarbons is obtained by first reacting alkali cellulose, in a system in which the sodium hydroxide:cellulose ratio (by weight) is within the range of 0.25:1 to 0.5:1 and the water:cellulose ratio (by weight) is within the range 0.7:1 to 1.6:1, with ethylene oxide in an amount sufficient to give a D. S. of about 0.3 to about 0.9 mole per mole cellulose (anhydroglucose unit) at a temperature within the range of about 20° C. to about 80° C. and subsequently reacting the partially hydroxyethylated product in a system in which the sodium hydroxide:hydroxyethyl cellulose ratio is within the range of about 2:1 to 8:1 and the water:hydroxyethyl cellulose ratio is within the range of about 1:1 to 8:1 with 2.6 to 2.9 moles ethyl chloride per anhydroglucose unit at a temperature within the range of 95° C. to 160° C. to an ethoxyl D. S. of 2.6 to 2.9.

The modified ethyl cellulose obtained in the process of this invention has an oxyethyl ($ROCH_2CH_2-$, $R=H$ or $C_2H_5-$) degree of substitution (D. S.) within the range of about 0.3 to 0.9 and a total ethoxy content corresponding to a degree of substitution within the range of 2.6 to 2.9 and is characterized by having a high degree of uniformity of substitution as indicated by an enhanced solubility in aromatic hydrocarbons and tolerance for aliphatic hydrocarbons over the range of oxyethyl and ethoxyl contents indicated above. In order to achieve these high solubility characteristics, the alkali cellulose must be uniformly hydroxyethylated until at least a hydroxyethyl D. S. of about 0.3 is reached.

The following examples wherein parts are by weight exemplify the process by which the ethyl cellulose of this invention is produced.

Example 1

A slurry of 400 parts chemical cellulose in 11,300 parts diethyl ether was stirred vigorously while 800 parts 20% sodium hydroxide solution was added slowly over a period of 15 minutes. The stirring was continued for 2 hours and the ether was then filtered off leaving a filter cake corresponding to an alkali cellulose of which the cellulose component amounted to 400 parts, the sodium hydroxide component amounted to 160 parts, and the water component amounted to 640 parts. This filter cake containing about 2200 parts residual ether was placed in an autoclave, from which air had been displaced by nitrogen, along with about 1400 parts ethyl ether and 118 parts ethylene oxide. This reaction mixture was heated to 70° C. over a one-half hour period and then maintained at 70° C. with agitation for 3 hours. At the end of this time the low-boiling components of the mixture were bled off and a sample of the product was taken for analysis. Analysis showed hydroxyethylation efficiency to be 35%. To the remainder of the product in the autoclave was then added 2620 parts 48.3% sodium hydroxide, 600 parts sodium hydroxide pellets, and 1600 parts ethyl chloride. The autoclave was then heated to 130° C. with stirring and maintained at that temperature for 5 hours. After this reaction period, the product was worked up by neutralizing the alkali with acetic acid, wet milling, and water washing until freed of salts. The resulting ethyl cellulose was then dried at 70° C. Analysis of this modified ethyl cellulose indicated the presence of 0.395 oxyethyl group per anhydroglucose unit and 2.48 ethoxyl groups per anhydroglucose unit. The ethoxyl analysis includes the total ethoxyl whether combined as ethoxyethyl groups or as ethoxy groups substituted directly on the cellulose molecule. Analysis of the hydroxyethyl cellulose sample prior to ethylation showed that it had good uniformity in substitution as indicated by good solubility in 5% sodium hydroxide solution and also showed 13.5% oxyethyl calculated as hydroxyethyl. The modified ethyl cellulose so produced had excellent solubility characteristics in toluene:alcohol (4:1) and had an aliphatic hydrocarbon tolerance (as defined in Examples 3–14) of about 40 compared with 10 for ethyl cellulose of 2.5 D. S.

*Example 2*

Alkali cellulose prepared by steeping 400 parts chemical cellulose in an excess of 20% sodium hydroxide solution for 1 hour and then pressing out all residual sodium hydroxide to a pressed weight of 1344 parts was masticated in a shredder and was then placed in an autoclave with 120 parts ethylene oxide, 136 parts diethylene ether and 1600 parts ethyl chloride. This mixture was agitated for 5 hours at 60° C. in the autoclave and then the excess low-boiling components were withdrawn and a sample of the resulting hydroxyethyl cellulose was taken for analysis. The hydroxyethyl cellulose sample showed good solubility in 5% sodium hydroxide and was shown by analysis to have a 0.38 hydroxyethyl D. S. and a 0.0 ethoxyl D. S. This corresponds to a hydroxyethylation efficiency of about 32%.

To the remaining hydroxyethyl cellulose in the autoclave were added 2090 parts 49.7% sodium hydroxide, 976 parts sodium hydroxide pellets, and 80 parts ether, and the 1600 parts ethyl chloride which were withdrawn were replaced along with the ether contained dissolved therein. This reaction mixture was then heated in the autoclave with agitation for 5 hours at 130° C. The modified ethyl cellulose product was worked up in the same manner as the product in Example 1. It was shown by analysis to have a D. S. of 2.64 ethoxyl groups and a D. S. of 0.38 oxyethyl group, the ethoxyl analysis being the total number of ethoxyl groups in the product. The solubility in toluene:alcohol (4:1) was excellent and the aliphatic hydrocarbon tolerance was about 65 compared with about 45 for ethyl cellulose of ethoxyl D. S.=2.64.

*Examples 3–14*

A series of hydroxyethyl cellulose samples having a hydroxyethyl D. S. within the range of 0.35 to 0.85 were prepared in the manner described for the first step of the process of Example 2. Each of these samples was then further reacted with ethyl chloride to produce a modified ethyl cellulose in accordance with this invention. In general, the procedure involved placing in an autoclave 30 parts of the hydroxyethyl cellulose containing sufficient added sodium hydroxide to correspond to 234 parts 50% sodium hydroxide in the mixture along with 161 parts sodium hydroxide pellets. The autoclave was cooled and 125 parts ethyl chloride were added so as to displace the air. Ethylation was then carried out by mixing these reagents in the autoclave for 16 hours at 130° C. The degree of ethylation was controlled in the various examples by the length of the time at which the ethylation was carried out. In the procedure just described, a product of 2.74 ethoxyl D. S. was obtained.

Each of these modified ethyl cellulose products was worked up by distilling off the volatile products from the autoclave, grinding the solids, washing the product with water until free of chlorides and subsequently drying in vacuo at 65° C. Each of the hydroxyethyl cellulose samples was analyzed for oxyethyl D. S. before ethylation by the total ether analysis of Morgan (Ind. Eng. Chem., Anal. Ed. 18, 500–504 (1946)) and the ethylated product was analyzed by total carbon analysis by combustion. The Morgan method of analysis in showing total ether content shows the hydroxyethyl D. S. and this is assumed to carry over as oxyethyl D. S. after ethylation. By using the total carbon analysis it is possible by means of simultaneous equations to estimate the relative composition as to oxyethyl D. S. and ethyl D. S.

Each of these samples was of good solubility in a toluene:alcohol (4:1) solution and was tested for aliphatic tolerance by determining the highest per cent by weight of heptane in a heptane-toluene mixture which will dissolve the cellulose ether to give a good 2% solution. The analytical results for oxyethyl D. S. and ethoxyl D. S. along with the aliphatic tolerances so determined are tabulated in the table below:

| Example | Oxyethyl D. S. | Ethoxyl D. S. | Aliphatic Tolerance |
| --- | --- | --- | --- |
| 3 | 0.55 | 2.89 | 70 |
| 4 | 0.35 | 2.84 | 75–80 |
| 5 | 0.83 | 2.81 | 80 |
| 6 | 0.85 | 2.80 | 75 |
| 7 | 0.66 | 2.74 | 75 |
| 8 | 0.35 | 2.73 | 70–75 |
| 9 | 0.39 | 2.69 | 50 |
| 10 | 0.37 | 2.68 | 50 |
| 11 | 0.35 | 2.66 | 60–65 |
| 12 | 0.35 | 2.53 | 45–55 |
| 13 | 0.38 | 2.23 | 0 |
| 14 | 0.41 | 2.16 | 0 |

Each of these samples within the scope of this invention is seen to have a good aliphatic hydrocarbon tolerance and it is substantially higher than the aliphatic hydrocarbon tolerance of an ethyl cellulose having substantially the same total ethoxyl D. S. Examples 13 and 14 show that the range of substitution is critical.

The modified ethyl cellulose of this invention is insoluble in water and dilute alkali and appears to have oxyethyl groups so uniformly distributed in the molecule along the cellulose chain as to give the enhanced solubility characteristics which the product shows. The aliphatic hydrocarbon tolerance of these products falling within the scope of this invention is in every case substantially greater than ethyl cellulose of the same ethoxyl D. S. and no other substituents. By "high aliphatic hydrocarbon tolerance" as used in this specification and claims is meant substantially higher aliphatic hydrocarbon tolerance than obtains for ethyl cellulose of the same ethoxyl D. S. in which no other substituents are present. Aliphatic hydrocarbon tolerance is defined by the procedure set forth in the examples.

The step of hydroxyethylation tends to improve the reactivity of the cellulose molecule; but the hydroxyethyl groups must be uniformly distributed with respect to the cellulose molecules so as to give the optimum in improved aliphatic hydrocarbon tolerance in the ethylated product. Since the hydroxyethyl groups are probably more reactive toward ethylation than are the hydroxyl groups of the cellulose molecule, it is believed that a high proportion of the oxyethyl groups may be present as ethoxyethyl groups. The term "oxyethyl" is used herein to cover both hydroxyethyl and ethoxyethyl. The improved solubility characteristics of the product are dependent not only upon the uniformity of distribution of the oxyethyl groups among and within the cellulose molecules, but also upon the degree of substitution of these groups. Thus, an extended study has shown that the oxyethyl D. S. must be within the range of about 0.3 to about 0.9. Below about 0.3 the ethylated product shows very little improvement in solubility characteristics and above about 0.9 the softening point drops rapidly with further substitution. The oxyethyl groups within this range of substitution and uniformly distributed not only improve reactivity in the ethylation process but they also improve the solubility and aliphatic hydrocarbon tolerance by the influence of the oxyethyl groups in preventing orientation of the highly ethylated cellulose chains.

Since uniform distribution of the oxyethyl groups is a requisite for the improved solubility characteristics, the hydroxyethylation must be carried out under optimum conditions for promoting uniformity of substitution. Due to the greater reactivity of a partially hydroxyethylated cellulose, it is much easier to obtain uniform distribution of the ethoxy groups subsequently introduced than in the case of the ethylation of cellulose itself with the net result that more complete ethylation under mild conditions takes place with high percentage conversion. Nevertheless, it is still necessary to use more concentrated alkali and higher temperatures for the ethylation step than is satisfactory for the hydroxyethylation step whereby uniform substitution is attained. Attempts to carry out both hydroxyethylation and ethylation simultaneously have not led to a product of improved solubility because hydroxyethylation cannot be satisfactorily carried out under the conditions of concentrated alkali and high temperatures required for ethylation and the amount of oxyethyl D. S. is incontrollable. Hydroxyethylation, for instance, may go almost explosively under the ethylation conditions and some ethylation may under such conditions take place prior to hydroxyethylation. These conditions lead to poor efficiency, below 20%, in the utilization of the ethylene oxide and the product of such a process also possesses poor solubility.

The process for producing the modified ethyl cellulose of this invention having the improved solubility characteristics is thus carried out by uniformly hydroxyethylating cellulose under the conditions specified which lead to a uniformly substituted active hydroxyethyl cellulose of low degree of substitution and subsequently ethylating the product under such conditions specified above as lead to ethylation of the hydroxyethyl groups and also part of the cellulose hydroxyl groups. The process can be carried out in two separate steps with intermediate purification of the hydroxyethyl cellulose. However, an important advantage of the present invention is that the two steps of the reaction can be carried out without an intermediate purification step simply by increasing the alkali concentration and increasing the temperature for the second step. The caustic used for hydroxyethylation then becomes available for ethylation. The ethylene oxide may be added as the sole reagent in the first step, or part or all of the ethyl chloride needed for the second step may be present during the hydroxyethylation. In this latter case the alkali concentration and temperature of reaction are such that the ethylation reaction does not take place. Regardless of whether the ethylene oxide is present alone or along with ethyl chloride in the first step of the reaction, the second step of the reaction is carried out by first increasing the alkali concentration by the addition of aqueous sodium hydroxide of high concentration or by the addition of aqueous sodium hydroxide of low concentration along with solid sodium hydroxide in order to produce the desired relationship between the amounts of cellulose, sodium hydroxide, and water required for optimum ethylation conditions. Since sodium hydroxide is consumed in the ethylation step, the alkali concentration normally changes during the course of the reaction. In order that the alkalinity conditions may be maintained more constant during the ethylation, a preferred embodiment which brings about improved results with respect to efficiency of reaction comprises adding part of the alkali stepwise or gradually during the course of the ethylation so as to avoid wide limits of alkalinity during that process. Likewise, the ethyl chloride may be introduced gradually during the course of the ethylation with advantageous results. By adding both the ethyl chloride and the sodium hydroxide solution gradually during the course of the ethylation, a still greater efficiency of reaction is attained. By predetermination of rate of reaction, it is possible to add the ethyl chloride at substantially the rate it is consumed. Since no intermediate purification step is necessary, the process of this invention is economical to carry out and competes with the usual process of ethylation for the production of certain grades of ethyl cellulose of lower ethoxyl D. S.

Besides hydroxyethylation in the presence of water-immiscible organic solvents, the process may also be a so-called "dry" process using no organic solvent. The ratio of water to cellulose as set forth herein is to be maintained regardless of the process used, and that ratio is based upon the water loosely bound to the cellulosic material. In the process using an organic solvent, the solvent must, therefore, contain sufficient dissolved water to prevent withdrawal of water from the cellulosic material.

Although ethylene oxide has been indicated as the hydroxyethylating agent, ethylene chlorohydrin may likewise be used provided that the alkalinity during the entire hydroxyethylation step is maintained within the same limits as have been indicated for the case in which ethylene oxide is used as the reagent. The alkalinity may be maintained within these limits during the hydroxyethylation step by gradually adding alkali during the course of the hydroxyethylation. Moreover, the ethylene chlorohydrin and alkali may both be added gradually during the course of the reaction. When ethylene chlorohydrin is used as the reagent, it is believed that ethylene oxide is an intermediate and that such a process would, therefore, involve the reaction between cellulose and ethylene oxide as is preferred in the present process because of the somewhat greater uniformity of substitution obtained thereby.

The process of this invention for production of a modified ethyl cellulose having high aliphatic hydrocarbon tolerance leads to a product having an ethyl D. S. in the range of about 2.6 to 2.9 which is a higher ethyl D. S. than is readily attainable in an ethyl cellulose produced by any known process for direct ethylation of cellulose. Moreover, the modified ethyl cellulose of this invention is distinctly superior in aliphatic hydrocarbon tolerance as compared with ethyl cellulose of the same ethyl D. S. The oxyethyl groups introduced into the cellulose in the present process thus not only improve the ease of introducing ethyl groups but also contribute to the improved solubility as measured by aliphatic hydrocarbon tolerance. The improved product results from the improvement in the ethylation process not only with respect to the use of hydroxyethyl cellulose of a narrow range of hydroxyethyl D. S. but also with respect to the use of special conditions of ethylation which calls for a ratio of cellulosic material to water and to alkali substantially different from that required in the reaction by which hydroxyethyl cellulose is produced. The process also requires a uniformly substituted hydroxyethyl cellulose, and one embodiment of this invention which combines the hydroxyethylation process with the ethylation process provides such a uniformly substituted hydroxyethyl cellulose in the first step. Although this embodiment is preferred, it is not critical for the end result, since uniformly hydroxyethylated cellulose of hydroxyethyl D. S. in the range of about 0.3 to about 0.9, regardless of how produced, may be used in the ethylation step.

What I claim and desire to protect by Letters Patent is:

1. The process for producing a water-insoluble, alkali-insoluble ethyl oxyethyl cellulose having a high aliphatic hydrocarbon tolerance which comprises uniformly hydroxyethylating cellulose to a hydroxyethyl D. S. within the range of 0.3 to 0.9 in a system in which the sodium hydroxide:cellulose ratio is within the range of 0.25:1 to 0.5:1 and the water:cellulose ratio is within the range of 0.7:1 to 1.6:1 with ethylene oxide at a temperature within the range of 20°–80° C. and subsequently ethylating the product with ethyl chloride at a temperature within the range of about 95°–160° C. to an ethoxyl D. S. (total) within the range of 2.6 to 2.9 in a system in which the sodium hydroxide:cellulose ratio is within the range of 2:1 to 8:1 and the water:cellulose ratio is within the range of 1:1 to 8:1.

2. The process for producing a water-insoluble, alkali-insoluble ethyl oxyethyl cellulose having a high aliphatic hydrocarbon tolerance which comprises reacting an alkali cellulose in an aqueous system in which the ratio of sodium hydroxide:cellulose is within the range of 0.25:1 to 0.5:1 and in which the water:cellulose ratio is within the range of 0.7:1 to 1.6:1 with ethylene oxide in an amount within the range of about 0.3 to about 0.9 mole per mole cellulose (anhydroglucose unit) at a temperature within the range of about 20° to about 80° C. and then adding sodium hydroxide and water in sufficient amount to bring the total in the system up to a sodium hydroxide:hydroxyethyl cellulose ratio within the range of about 2.0:1 to 8:1 and water:hydroxyethyl cellulose ratio within the range of 1:1 to 8:1 and reacting with ethyl chloride in an amount within the range of about 2.6 to about 2.9 moles per mole hydroxyethyl cellulose at a temperature within the range of about 95° to 160° C.

3. The process for producing a water-insoluble, alkali-insoluble ethyl oxyethyl cellulose having a high aliphatic hydrocarbon tolerance which comprises treating an aqueous alkali cellulose composition, in which the ratio of sodium hydroxide:cellulose is within the range of about 0.25:1 to 0.5:1 and in which the water in the system is 0.7 to 1.6 times the weight of the cellulose, with ethylene oxide in a molecular amount sufficient to give a D. S. in the range of about 0.3 to about 0.9 and ethyl chloride in an amount within the range of about 3 to about 25 based on the cellulose, heating at a temperature within the range of about 50° to 75° C. until the ethylene oxide has reacted substantially completely, adding sufficient aqueous sodium hydroxide to increase the sodium hydroxide content to 2 to 8 times the weight of the cellulose and the water content to 1 to 8 times the weight of the cellulose, and heating at a temperature within the range of about 95° to 160° C. until a modified ethyl cellulose having an ethoxyl corresponding to a D. S. within the range of 2.6 to 2.9 is obtained.

4. The process for producing a water-insoluble, alkali-insoluble ethyl oxyethyl cellulose having a high aliphatic hydrocarbon tolerance which comprises reacting an alkali cellulose in an aqueous system in which the ratio of sodium hydroxide:cellulose is in the range of 0.25:1 to 0.5:1 and the ratio of water:cellulose is in the range of 0.7:1 to 1.6:1 with ethylene oxide in an amount within the range of about 0.3 to about 0.9 mole per mole cellulose (anhydroglucose unit) at a temperature within the range of about 20° to about 80° C. and then raising the temperature to a temperature within the range of about 95° to 160° C. and adding aqueous sodium hydroxide to increase the sodium hydroxide:cellulose ratio to the range of 2:1 to 8:1 and the water:cellulose ratio to the range of 1:1 to 8:1 and subsequently adding ethyl chloride and aqueous sodium hydroxide in substantially equivalent ratio at substantially the rate consumed while maintaining a temperature within the range of about 95° to 160° C. until a modified ethyl cellulose having a total ethoxyl content corresponding to a D. S. of 2.6 to 2.9 is reached.

5. In the process of producing an ethyl oxyethyl cellulose having oxyethyl and ethyl substituents, the improvement, by which a modified ethyl cellulose having a high aliphatic hydrocarbon tolerance is produced, which comprises causing hydroxyethyl cellulose, having a hydroxyethyl D. S. within the range of about 0.3 to about 0.9, in intimate admixture with sodium hydroxide and water in respective amounts within the range of 2 to 8 and 1 to 8 times the weight of the hydroxyethyl cellulose, to react with about 2.6 to about 2.9 moles ethyl chloride.

6. As a new composition of matter a modified ethyl oxyethyl cellulose having an oxyethyl degree of substitution within the range of 0.3 to 0.9 and a total ethoxyl content corresponding to a degree of substitution within the range of 2.6 to 2.9 and characterized by solubility in organic solvents and tolerance for aliphatic hydrocarbons substantially greater than ethyl cellulose of the same ethoxyl content.

7. As a new composition of matter a modified ethyl ethoxyethyl cellulose having an oxyethyl degree of substitution within the range of 0.35 to 0.45 and a total ethoxyl content corresponding to a degree of substitution within the range of 2.75 to 2.9 and characterized by solubility in organic solvents and tolerance for aliphatic hydrocarbons substantially greater than ethyl cellulose of the same ethoxyl content.

EUGENE D. KLUG.

REFERENCES CITED

The following references are of record in the file of this patent:

UNITED STATES PATENTS

| Number | Name | Date |
|---|---|---|
| 1,483,738 | Lilienfeld | Feb. 12, 1924 |
| 1,877,856 | Hagedorn | Sept. 20, 1932 |
| 2,033,126 | Dreyfuss | Mar. 10, 1936 |